2,749,270

ALKYLATED VANILLIN SEMICARBAZONES AND PROCESSES FOR PREPARING AND USING THE SAME

John D. Garber, Cranford, N. J., assignor to Merck & Co., Inc., Rahway, N. J., a corporation of New Jersey No Drawing. Application March 15, 1954,
Serial No. 416,429

5 Claims. (Cl. 167—30)

This invention relates to novel derivatives of vanillin. Specifically, it is concerned with the semicarbazide derivatives of 5-allyl vanillin allyl ether and 5-propyl vanillin allyl ether, methods of preparing these compounds, and new fungicidal compositions containing these semicarbazones.

The semicarbazide derivatives of 5-allyl vanillin allyl ether (I) and 5-propyl vanillin-allyl ether (II) of the formulas

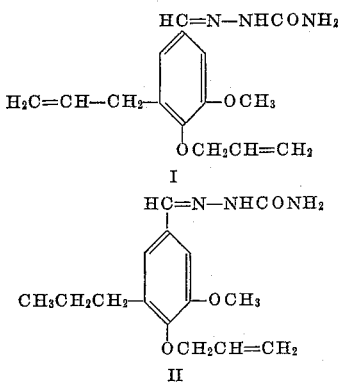

are useful as fungicides and insecticides. These products are particularly valuable since in contrast to the parent aldehydes they possess a much higher degree of stability in water.

It is an object of the present invention to provide these novel derivatives of vanillin, and methods of preparing these products. Other objects will be apparent from the detailed description of my invention hereinafter provided.

The semicarbazide derivatives of the present invention are readily prepared by reacting the allyl ether derivatives of 5-allyl vanillin or 5-propyl vanillin with a semicarbazide acid salt in the presence of an alkali metal acetate such as sodium acetate. The product obtained by this reaction can be further purified, if desired, by recrystallization from aqueous ethanol.

The allyl ether derivatives of 5-allyl vanillin and 5-propyl vanillin used as the starting materials can be readily prepared from vanillin. One method comprises treating vanillin with allyl bromide to form vanillin allyl ether, heating this compound to cause rearrangement and form 5-allyl vanillin, and reacting the latter product with allyl bromide to produce the allyl ether of 5-allyl vanillin. The allyl ether of 5-propyl vanillin is prepared by catalytically hydrogenating 5-allyl vanillin to form 5-n-propyl vanillin, and reacting this compound with allyl bromide to obtain the desired ether.

The semicarbazone derivatives of 5-allyl vanillin allyl ether and 5-propyl vanillin allyl ether are effective in inhibiting the growth of various fungi and are therefore valuable fungicides, particularly, in the textile and/or agricultural fields. Thus, the semicarbazone of 5-allyl vanillin allyl ether inhibits the growth of *Chaetomium globosum* and *Alternaria oleracea* at concentrations of 0.001 to 0.0001 mols per liter. Further, I have found that this semicarbazone derivative is an effective agent in protecting stored grain and seeds. For example, in experiments with flaxseed and wheat it has been found that the addition of 0.1 and 0.01% by weight of the semicarbazone of 5-allyl vanillin allyl ether to these grains is effective in inhibiting mold growth on the grains maintained at 30% moisture content for ten days whereas under the same conditions the untreated grains showed a heavy mold growth in two or three days.

The new compounds of the present invention either alone or in combination with other insecticides and/or fungicidal agents and a suitable carrier therefor may be applied to plants and the like by spraying, dusting, dipping, etc. in the form of suspensions, solutions, powders, and the like containing the most desirable active principles in optimum concentrations for the particular purpose at hand. Such insecticidal and/or fungicidal compositions may in addition contain various wetting and/or spreading agents and may be formulated and applied in accordance with procedures well known in this art.

The semicarbazones of 5-n-propyl vanillin allyl ether and 5-allyl vanillin allyl ether can be used in suitable solvents or mixtures of solvents at optimum concentrations with respect to the intended purpose for which it is to be used. Suitable solvents for this purpose include alcohols, aqueous-alcoholic mixtures, and the like. Further, these products can be suspended in suitable vehicles or a combination of vehicles in accordance with accepted practice in the art. For example, they can be suspended in aqueous mediums which may also contain various wetting or spreading agents and/or other insecticidal or fungicidal compounds. Alternatively, the semicarbazones can also be used in the form of dusting powders wherein the semicarbazones are mixed with or adsorbed on finely divided carriers such as volcanic ash, kieselguhr, carbon, bentonite, fuller's earth, nut shell flours, talc and the like.

The concentration of the semicarbazones used in the above described solutions, suspensions or dusting powders are, of course, dependent upon the particular purpose for which it is intended. In general, I have found that concentration of the semicarbazones ranging from about $\frac{1}{10}\%$ to 10% of the weight of the carrier are useful, although for most purposes I prefer to use an amount ranging from about $\frac{1}{2}\%$ to 5%.

The following examples are presented to illustrate methods of preparing the novel compounds of this invention.

EXAMPLE 1

*Semicarbazone of 5-n-propyl vanillin allyl ether*

About 2.3 g. (0.01 mol.) of 5-n-propyl vanillin allyl ether was reacted with 1.1 g. (0.01 mol.) of semicarbazide hydrochloride in an aqueous ethanol solution containing 0.8 g. of sodium acetate. The semicarbazone derivative of 5-n-propyl vanillin allyl ether precipitated from the resulting reaction mixture and was recrystallized from dilute ethanol to obtain the crystalline product melting at 46–47° C.

Sample submitted for micro analysis, M. P. 46.5–47.0° C., carbon: calculated 61.83%, found 62.15%; hydrogen: calculated 7.27%, found 7.21%.

EXAMPLE 2

*Semicarbazone of 5-allyl vanillin allyl ether*

About 2.3 g. (0.01 mol.) of 5-allyl vanillin allyl ether was reacted with 1.1 g. of semicarbazide hydrochloride in aqueous ethanol containing 0.8 g. (0.01 mol) of sodium acetate. The semicarbazone of 5-allyl vanillin allyl ether precipitated from solution and was further purified by recrystallization from dilute ethanol to obtain the product in crystalline form having a melting point of 58–60° C.

Sample of the product submitted for micro analysis, M. P. 62° C., carbon: calculated 62.27%, found 61.89%; hydrogen: calculated 6.62%, found 7.31%.

Various changes and modifications in the procedures herein disclosed will occur to those skilled in the art, and to the extent that such changes and modifications are embraced by the appended claims, it is to be understood that they constitute part of my invention.

I claim:

1. A compound from the group consisting of the semicarbazone of 5-n-propyl-vanillin allyl ether and the semicarbazone of 5-allyl vanillin allyl ether.

2. Semicarbazone of 5-n-propyl vanillin allyl ether.

3. Semicarbazone of 5-allyl vanillin allyl ether.

4. A fungicidal composition containing as an active ingredient a semicarbazone from the group consisting of the semicarbazone of 5-n-propyl vanillin allyl ether and the semicarbazone of 5-allyl vanillin allyl ether, and a carrier therefor.

5. The method of inhibiting the growth of fungus on materials susceptible thereto which comprises impregnating said materials with a semicarbazone from the group consisting of the semicarbazone of 5-n-propyl vanillin allyl ether and the semicarbazone of 5-allyl vanillin allyl ether.

No references cited.